United States Patent
Ihley-Fortuna et al.

(10) Patent No.: US 12,083,443 B1
(45) Date of Patent: Sep. 10, 2024

(54) JIGSAW PUZZLE AND CRAFT SUPPORT AND STORAGE DEVICE

(71) Applicants: Joan Ihley-Fortuna, Salem, NH (US); Paul Fortuna, Salem, NH (US)

(72) Inventors: Joan Ihley-Fortuna, Salem, NH (US); Paul Fortuna, Salem, NH (US)

( * ) Notice: Subject to any disclaimer, the term of this patent is extended or adjusted under 35 U.S.C. 154(b) by 200 days.

(21) Appl. No.: 17/898,581

(22) Filed: Aug. 30, 2022

(51) Int. Cl.
| | |
|---|---|
| *A63F 9/10* | (2006.01) |
| *A47B 13/08* | (2006.01) |
| *A47B 23/00* | (2006.01) |
| *A47B 37/00* | (2006.01) |
| *A47B 83/04* | (2006.01) |
| *F16M 11/04* | (2006.01) |
| *F16M 11/14* | (2006.01) |

(52) U.S. Cl.
CPC .......... *A63F 9/1044* (2013.01); *A47B 13/081* (2013.01); *A47B 23/001* (2013.01); *A47B 37/00* (2013.01); *A47B 83/045* (2013.01); *F16M 11/046* (2013.01); *F16M 11/14* (2013.01); *A63F 2009/105* (2013.01)

(58) Field of Classification Search
CPC ............. A63F 9/1044; A63F 2009/105; A47B 13/081; A47B 23/001; A47B 37/00; A47B 83/045; F16M 11/046; F16M 11/14
See application file for complete search history.

(56) References Cited

U.S. PATENT DOCUMENTS

| 431,036 A | * | 7/1890 | Dawson | A47B 23/042 108/1 |
|---|---|---|---|---|
| 1,987,496 A | * | 1/1935 | Springborn | A63F 9/1044 273/157 R |
| 2,145,462 A | * | 1/1939 | Speck | A45C 15/04 132/288 |
| 2,985,333 A | * | 5/1961 | Kirkman | A47B 88/90 220/533 |
| 3,156,510 A | * | 11/1964 | Hindin | A47B 67/005 312/223.5 |
| 3,191,937 A | * | 6/1965 | Kropinski | A63F 9/06 446/124 |
| 3,792,668 A | * | 2/1974 | Ward | A47B 1/00 190/11 |
| 4,106,597 A | * | 8/1978 | Shook | A45C 13/02 190/110 |

(Continued)

FOREIGN PATENT DOCUMENTS

| CN | 113925281 A | * | 1/2022 | |
|---|---|---|---|---|
| DE | 202023103410 U1 | * | 8/2023 | A63F 9/1044 |
| WO | 2013019115 | | 2/2013 | |

*Primary Examiner* — Steven B Wong (57) ABSTRACT

The jigsaw puzzle and craft support and storage device comprises a sorting tray, a craft table, a telescoping arm, an optional magnifier, and a cover. The jigsaw puzzle and craft support and storage device may be a tool for storing and assembling a jigsaw craft. The sorting tray may be operable to store a plurality of craft pieces. The plurality of craft pieces may be sorted into a plurality of sorting compartments within the sorting tray. The craft table may be a platform upon which the jigsaw craft may be assembled. The craft table may be elevated above the sorting tray by the telescoping arm during use. The craft table may be adapted to tilt and swivel for the viewing comfort of a user. The craft table may comprise a plurality of lights to illuminate the plurality of craft pieces.

17 Claims, 5 Drawing Sheets

(56) References Cited

U.S. PATENT DOCUMENTS

| | | | | |
|---|---|---|---|---|
| 4,302,013 | A | | 11/1981 | Kavis |
| 4,372,630 | A | * | 2/1983 | Fuhri ..................... A47B 97/08 312/231 |
| 4,436,307 | A | * | 3/1984 | Caldwell .............. A63F 9/1044 273/157 R |
| 4,484,745 | A | | 11/1984 | Sleeper |
| 4,865,325 | A | * | 9/1989 | Stolz .................... A63F 9/1044 273/157 R |
| 5,123,846 | A | * | 6/1992 | Lewis ................... A63F 3/0434 434/150 |
| 5,273,289 | A | | 12/1993 | Morse |
| D393,761 | S | * | 4/1998 | Hinton ......................... D21/478 |
| 5,895,049 | A | | 4/1999 | Fingers, Jr. |
| 6,327,982 | B1 | * | 12/2001 | Jackson ............... A47B 23/046 108/142 |
| 6,811,006 | B1 | * | 11/2004 | Mundle ................. A45C 13/02 190/18 R |
| 7,552,821 | B1 | * | 6/2009 | Demers ................ A63F 9/1044 206/499 |
| 8,020,829 | B1 | * | 9/2011 | Tamayori ............... F16M 13/00 108/144.11 |
| 8,235,207 | B2 | * | 8/2012 | Dietenberger ........ A63F 9/1044 273/148 R |
| 9,557,002 | B2 | * | 1/2017 | Wong ................. F16M 11/2064 |
| 10,617,202 | B1 | * | 4/2020 | Cardona ................ A47B 27/16 |
| D895,283 | S | * | 9/2020 | Huang .......................... D3/901 |
| 11,388,990 | B1 | * | 7/2022 | Watkins ................ A63F 9/1044 |
| 2006/0238090 | A1 | * | 10/2006 | Jordan ................... A47B 3/083 312/352 |
| 2007/0266911 | A1 | * | 11/2007 | Lee ....................... A63F 9/1044 108/60 |
| 2011/0036275 | A1 | | 2/2011 | Covarrubio |
| 2021/0170267 | A1 | | 6/2021 | Malki |
| 2021/0170268 | A1 | * | 6/2021 | Malki ................... A63F 9/1044 |
| 2021/0252381 | A1 | | 8/2021 | Paulhamus |
| 2022/0370891 | A1 | * | 11/2022 | Weig ................. B65D 77/0413 |
| 2023/0097737 | A1 | * | 3/2023 | Che ....................... A47B 13/083 108/1 |
| 2023/0356069 | A1 | * | 11/2023 | Che ....................... A63F 9/1044 |

\* cited by examiner

JIGSAW PUZZLE AND CRAFT SUPPORT AND STORAGE DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of jigsaw, crafts, and entertainment equipment, more specifically, a jigsaw puzzle and craft support and storage device.

SUMMARY OF INVENTION

The jigsaw puzzle and craft support and storage device comprises a sorting tray, a craft table, a telescoping arm, an optional magnifier, and a cover. The jigsaw puzzle and craft support and storage device may be a tool for storing and assembling a jigsaw craft. The sorting tray may be operable to store a plurality of craft pieces. The plurality of craft pieces may be sorted into a plurality of sorting compartments within the sorting tray. The craft table may be a platform upon which the jigsaw craft may be assembled. The craft table may be elevated above the sorting tray by the telescoping arm during use. The craft table may be adapted to tilt and swivel for the viewing comfort of a user. The craft table may comprise a plurality of lights to illuminate the plurality of craft pieces.

An object of the invention is to provide a sorting tray for storing and sorting a plurality of craft pieces.

Another object of the invention is to provide a craft table upon which a jigsaw craft may be assembled and which craft table is elevated above the sorting tray by a telescoping arm.

A further object of the invention is to provide a plurality of dividers forming a plurality of sorting compartments in the sorting tray and at least one drawer located within the bottom of the sorting tray.

Yet another object of the invention is to provide a raised edge surrounding the craft table with a plurality of battery-operated light located within the raised edge such that the plurality of lights may illuminate the top of the craft table.

These together with additional objects, features and advantages of the jigsaw puzzle and craft support and storage device will be readily apparent to those of ordinary skill in the art upon reading the following detailed description of the presently preferred, but nonetheless illustrative, embodiments when taken in conjunction with the accompanying drawings.

In this respect, before explaining the current embodiments of the jigsaw puzzle and craft support and storage device in detail, it is to be understood that the jigsaw puzzle and craft support and storage device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the jigsaw puzzle and craft support and storage device.

It is therefore important that the claims be regarded as including such equivalent construction insofar as they do not depart from the spirit and scope of the jigsaw puzzle and craft support and storage device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Detailed reference will now be made to a first potential embodiment of the disclosure, which is illustrated in FIGS. 1 through 5.

The jigsaw puzzle and craft support and storage device 100 (hereinafter invention) comprises a sorting tray 200, a craft table 230, and a telescoping arm 250, an optional magnifier 270, and a cover 290. The invention 100 may be a tool for storing and assembling a jigsaw puzzle or a craft. The sorting tray 200 may be operable to store a plurality of jigsaw puzzle pieces or items of craft pieces 777. The plurality of jigsaw puzzle pieces or craft pieces 777 may be sorted into a plurality of sorting compartments 208 within the sorting tray 200. The craft table may be a platform upon which the jigsaw puzzle or craft may be assembled. The craft table 230 may be elevated above the sorting tray 200 by the telescoping arm 250 during use. The craft table 230 may be adapted to tilt and swivel for the viewing comfort of a user. The craft table 230 may comprise a plurality of lights 236 to illuminate the plurality of craft pieces.

The sorting tray 200 may be an open-top container comprising a plurality of side walls 202 and a bottom 204. The bottom of the telescoping arm 250 may be coupled to the sorting tray 200. The sorting tray 200 may comprise a plurality of dividers 206 which may form the plurality of sorting compartments 208 within the sorting tray 200. The plurality of craft pieces may be sorted by placing one or more craft pieces having similar attributes into one of the plurality of sorting compartments 208. As non-limiting examples, the similar attributes may comprise coloring, pattern, use on a border of the jigsaw craft, or any combination thereof. The plurality of dividers 206 may be laterally oriented, longitudinally oriented, or both. In some embodiments, some or all of the plurality of dividers 206 may be removable and replaceable such that the size and/or orientation of the plurality of sorting compartments 208 may be reconfigured.

The sorting tray 200 may comprise a swivel base 210 such that the sorting tray 200 may be rotated through 360 degrees within a horizontal plane. The swivel base 210 may be coupled to the center of the underside of the bottom 204. The swivel base 210 may comprise a foot 212 and a slewing bearing 214. The slewing bearing 214 may be coupled to the bottom of the sorting tray 200. The foot 212 may be coupled to the bottom of the slewing bearing 214. The invention 100 may rest upon the foot when in use and may rotate at the slewing bearing 214.

Figure 1:
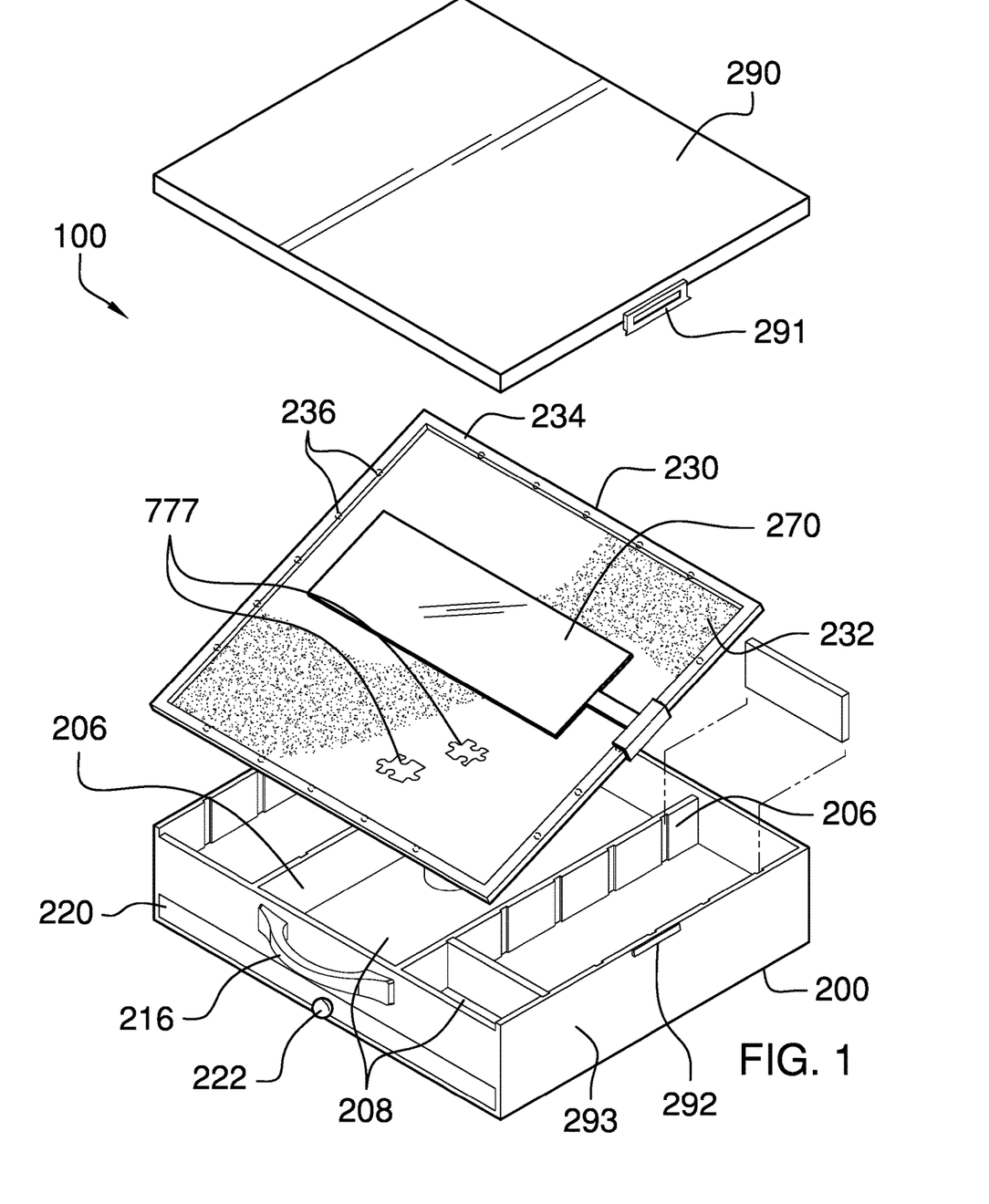
FIG. 1 is an isometric view of an embodiment of the disclosure.
Figure 2:
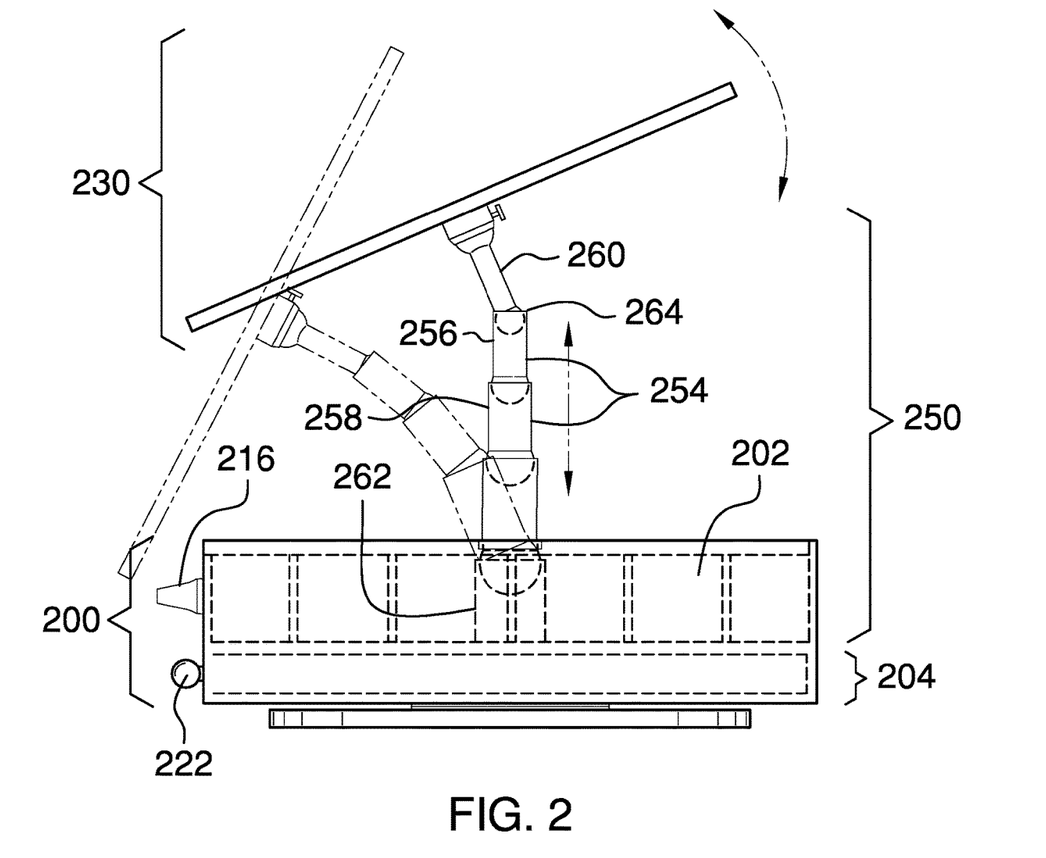
FIG. 2 is a side view of an embodiment of the disclosure.
Figure 3:
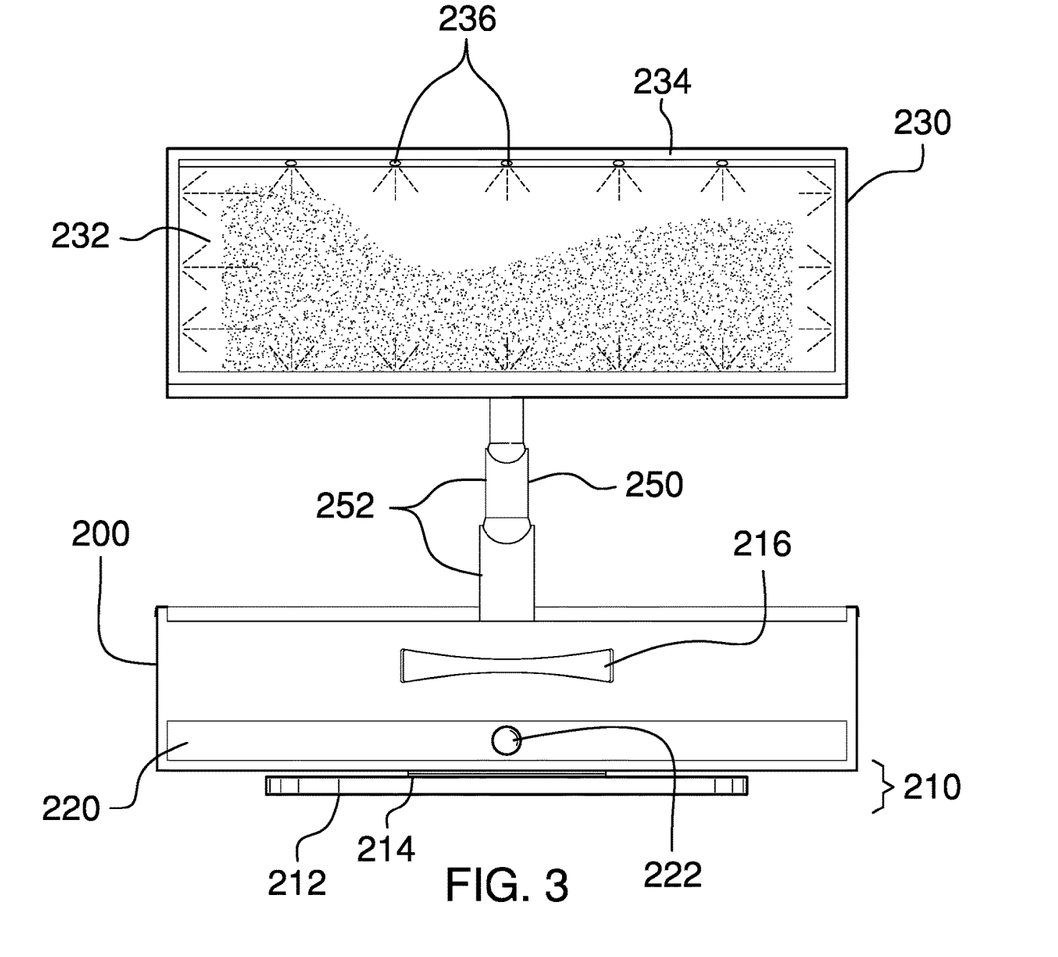
FIG. 3 is a front view of an embodiment of the disclosure, illustrating the craft table elevated above the sorting tray.
Figure 4:
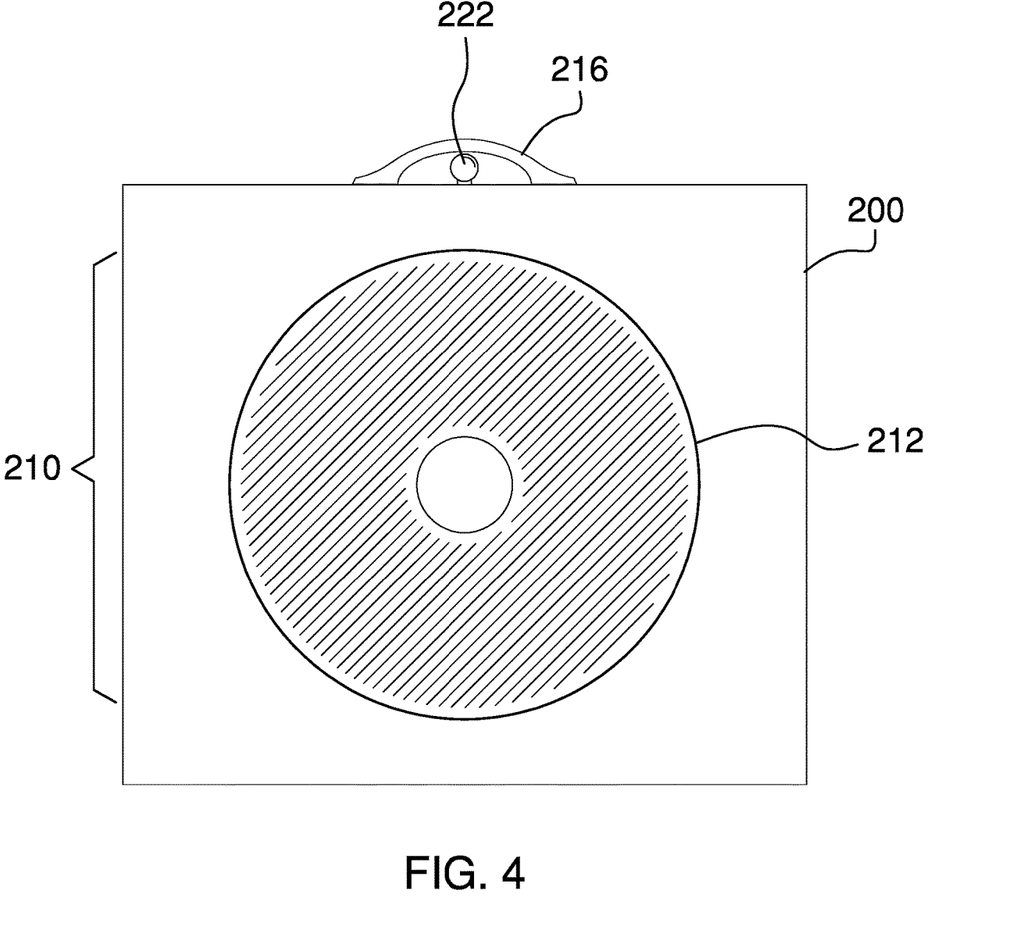
FIG. 4 is a bottom view of an embodiment of the disclosure.

The bottom 204 may comprise at least one drawer 220. The at least one drawer 220 may be a storage compartment that may slide into and out of the bottom 204. The at least one drawer 220 may be configured to store the plurality of craft pieces. Each of the at least one drawers 220 may comprise one or more drawer handles 222 that are adapted to be grasped by the user when opening the at least one drawers 220.

The sorting tray 200 may comprise a carrying handle 216 that may be adapted to be grasped by the user in order to carry the invention 100.

The craft table 230 may be a work surface upon which the jigsaw craft may be assembled. The top of the telescoping arm 250 may couple to the bottom center of the craft table 230 such that the craft table 230 may be elevated above the sorting tray 200 for use and may be lowered to cover the open top of the sorting tray 200 when not in use. The craft table 230 may be adapted to tilt and swivel such that the craft table 230 may be oriented to face the user. The top of the craft table 230 may comprise a non-slip surface 232 that may prevent the plurality of craft pieces from sliding when the craft table 230 is tilted away from a horizontal orientation. The non-slip surface 232 may be made of one or more materials that increase friction with contacted items due to pile, weave, texture, intrinsic properties of the materials, of any combination thereof. As non-limiting examples, the non-slip surface 232 may be made of velvet, natural rubber, or synthetic rubber.

The craft table 230 may comprise a raised edge 234. The raised edge 234 may prevent the one or more craft pieces from being pushed off of the craft table 230. The raised edge 234 may comprise the plurality of lights 236 that may be positioned above the plane of the craft table 230. The plurality of lights 236 may be battery-operated and may be energized to illuminate the plurality of craft pieces that reside on top of the craft table 230.

Figure 5:
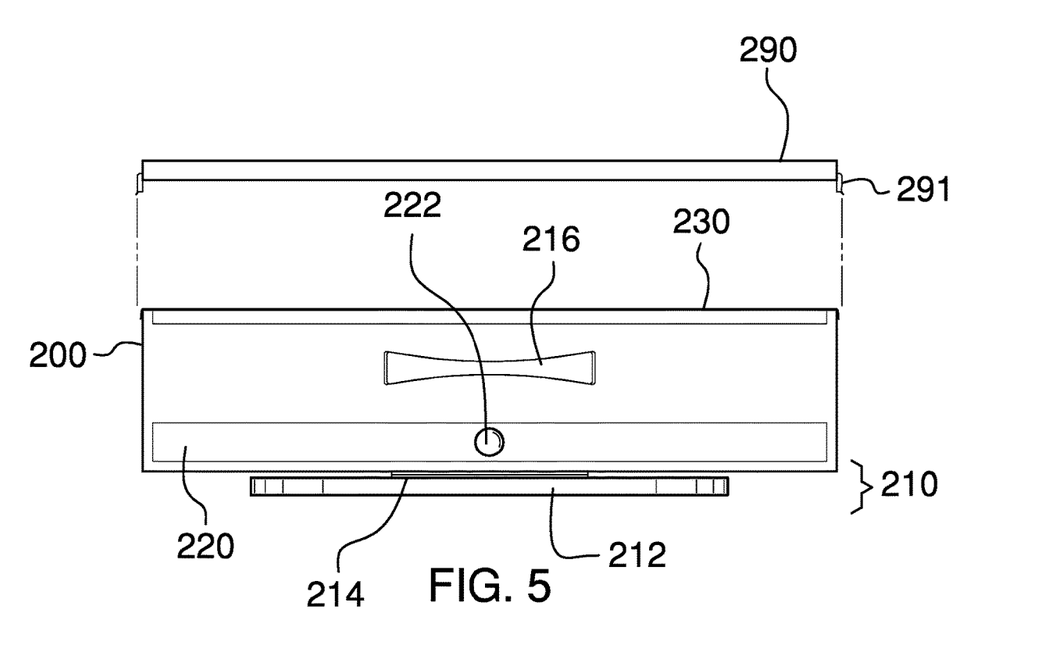
FIG. 5 is a front view of an embodiment of the disclosure, illustrating the craft table lowered.

The telescoping arm 250 may be an adjustable length armature comprising a plurality of arm segments 252. The telescoping arm 250 may be oriented vertically between the sorting tray 200 and the craft table 230. The telescoping arm 250 may be lengthened by pulling up on the craft table 230 and may be shortened by pushing down on the craft table 230. As a non-limiting example, for two adjacent arm segments 254 selected from the plurality of arm segments 252 the outside diameter of a first arm segment 256 may match the inside diameter of a second arm segment 258 such that an external force may cause the first arm segment 256 to slide within the second arm segment 258 however the first arm segment 256 and the second arm segment 258 may hold the relative positions for the two adjacent arm segments 254 in the absence of the external force.

A bottom arm segment 262 of the telescoping arm 250 may be coupled to the center of the sorting tray 200. The maximum height of the bottom arm segment 262 may be less than the maximum height of the plurality of side walls 202 such that the bottom arm segment 262 does not extend above the plurality of side walls 202. When the telescoping arm 250 is fully collapsed, all of the plurality of arm segments 252 may reside within the bottom arm segment 262 such that no individual arm segments extend above the plurality of side walls 202.

A top arm segment 260 may comprise a tilt/swivel joint 264 such that the craft table 230 may tilt and/or swivel with respect to the telescoping arm 250. The tilt/swivel joint 264 may permit the craft table 230 to tilt forward and backwards, tilt left and right, rotate around a vertical axis, or any combination thereof. As a non-limiting example, the tilt/swivel joint 264 may be a ball joint.

In use, the sorting tray 200 may be placed on a table, counter, or other work surface. The craft table 230 may be elevated by grasping the craft table 230 and lifting such that the telescoping arm 250 extends. The telescoping arm 250 may retain the craft table 230 at the elevated position. The craft table 230 may be tilted forward, rearward, to the left, to the right, or any combination thereof such that the user attains the best viewing angle of the top of the craft table 230. The craft table 230 may be rotated to change the viewing angle. In addition, the sorting tray 200 may swivel around the swivel base 210 to reposition the at least one drawer 220. The plurality of craft pieces may be removed from the at least one drawer 220 and may be sorted using the plurality of sorting compartments 208 accessible on the top of the sorting tray 200. The jigsaw craft may be assembled on the top surface of the craft table 230. The plurality of lights 236 located within the raised edge 234 of the craft table 230 may be energized to provide illumination of the jigsaw craft.

The optional magnifier 270 would be able to clip onto the raised edge 234 of the craft table 230. The cover 290 would also include cover clips 291 that are able to clip onto a clip catch provided on an exterior, side surface 293 of the sorting tray 200. This enables the cover 290 to protect the craft or puzzle being worked on the craft table 230 when not in use.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used herein, "ball joint" may refer to a type of ball and socket coupling that allows at least limited rotation around three perpendicular axis.

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used. The battery may require electrical contacts which may not be illustrated in the figures.

As used in this disclosure, a "bearing" may be anything that holds a rotating or sliding shaft or tube. A bearing may guide a moving component, limit the motion of a moving component relative to a fixed component and/or reduce the friction between the moving component and the fixed component.

As used herein, the words "couple", "couples", "coupled" or "coupling", may refer to connecting, either directly or indirectly, and does not necessarily imply a mechanical connection.

As used in this disclosure, a "diameter" of an object is a straight line segment that passes through the center (or center axis) of an object. The line segment of the diameter is terminated at the perimeter or boundary of the object through which the line segment of the diameter runs.

As used in this disclosure, a "drawer" may be a storage compartment that is designed to slide into and out of a larger object.

As used herein, "handle" may refer to an object by which a tool, object, or door is held or manipulated with the hand.

As used in this disclosure, "horizontal" may be a directional term that refers to a direction that is perpendicular to the local force of gravity. Unless specifically noted in this disclosure, the horizontal direction is always perpendicular to the vertical direction.

As used herein, "inside diameter" or "inner diameter" may refer to a measurement made on a hollow object. Specifically, the inside diameter is the distance from one inside wall to the opposite inside wall.

As used in this disclosure, the word "lateral" may refer to the sides of an object or movement towards a side. Lateral directions are generally perpendicular to longitudinal directions. "Laterally" may refer to movement in a lateral direction.

As used herein, the word "longitudinal" or "longitudinally" may refer to a lengthwise or longest direction or to a direction that is perpendicular to the lateral direction.

As used here, "non-slip" may refer to a property of an object that makes the object less likely to slide than an object that is not non-slip. The non-slip property may be especially useful if the object encounters surfaces that are flat, wet, or both. Factors that may increase the non-slip property of an object may include the choice of material and the shape of the object. As non-limiting examples, an object with a rubber surface with treads may be non-slip.

As used in this disclosure, "orientation" may refer to the positioning and/or angular alignment of a first object relative to a second object or relative to a reference position or reference direction.

As used herein, "outside diameter" or "outer diameter" may refer to a measurement made on an object. Specifically, the outside diameter is the distance from one point on the outside of the object to a point on the opposite side of the object along a line passing through the center of the object.

As used herein, "jigsaw craft" (sometimes referred to as a "picture craft") may refer to a tiling craft that requires the assembly of irregularly-shaped interlocking pieces, each of which typically has a portion of a picture. When assembled in the correct locations, the interlocking pieces may reveal the complete picture.

As used herein, "slewing bearing" may refer to a device that is used to rotate an object on a horizontal surface. Slewing bearings may be called turntable bearings or a Lazy Susan bearing.

As used in this disclosure, "telescopic", "telescoping", and "telescopically" may refer to an object made of two or more sections that fit or slide into each other such that the object can be made longer or shorter by adjusting the relative positions of the sections.

As used in this disclosure, "vertical" may refer to a direction that is parallel to the local force of gravity. Unless specifically noted in this disclosure, the vertical direction is always perpendicular to horizontal.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A jigsaw puzzle and craft support and storage device comprising:
   a sorting tray, a craft table, and a telescoping arm;
   wherein the jigsaw puzzle and craft support and storage device is a tool for storing and assembling a jigsaw puzzle or a craft;
   wherein the sorting tray is operable to store a plurality of jigsaw puzzle pieces or craft pieces;
   wherein the plurality of jigsaw puzzle pieces or craft pieces are sorted into a plurality of sorting compartments within the sorting tray;
   wherein the craft table is a platform upon which the jigsaw puzzle or the craft is assembled;
   wherein the craft table is elevated above the sorting tray by the telescoping arm during use;
   wherein the craft table is adapted to tilt and swivel for the viewing comfort of a user;
   wherein the craft table comprises a plurality of lights to illuminate the plurality of jigsaw puzzle pieces or craft pieces;
   wherein the sorting tray is an open-top container comprising a plurality of side walls and a bottom;
   wherein the sorting tray comprises a plurality of dividers which forms the plurality of sorting compartments within the sorting tray;

wherein the plurality of jigsaw puzzle or craft pieces are sorted by placing one or more pieces having similar attributes into one of the plurality of sorting compartments;

wherein the plurality of dividers are laterally oriented, longitudinally oriented, or both;

wherein the sorting tray comprises a swivel base such that the sorting tray rotates through 360 degrees within a horizontal plane;

wherein the swivel base is coupled to the center of the underside of the bottom;

wherein the swivel base comprises a foot and a slewing bearing;

wherein the slewing bearing is coupled to the bottom of the sorting tray;

wherein the foot is coupled to the bottom of the slewing bearing;

wherein the jigsaw puzzle and craft support and storage device rests upon the foot when in use and rotates at the slewing bearing.

2. The jigsaw puzzle and craft support and storage device according to claim 1;

wherein the bottom of the telescoping arm is coupled to the sorting tray.

3. The jigsaw puzzle and craft support and storage device according to claim 2 wherein the similar attributes comprises coloring, pattern, use on a border of the jigsaw puzzle or craft, or any combination thereof.

4. The jigsaw puzzle and craft support and storage device according to claim 3 wherein some or all of the plurality of dividers are removable and replaceable such that the size and/or orientation of the plurality of sorting compartments are reconfigured.

5. The jigsaw puzzle and craft support and storage device according to claim 4 wherein the bottom comprises at least one drawer;

wherein the at least one drawer is a storage compartment that slides into and out of the bottom;

wherein the at least one drawer is configured to store the plurality of jigsaw puzzle pieces or craft pieces;

wherein each of the at least one drawers comprise one or more drawer handles that are adapted to be grasped by the user when opening the at least one drawers.

6. The jigsaw puzzle and craft support and storage device according to claim 5 wherein the sorting tray comprises a carrying handle that is adapted to be grasped by the user in order to carry the jigsaw puzzle and craft support and storage device.

7. The jigsaw puzzle and craft support and storage device according to claim 6 wherein the craft table is a work surface upon which the jigsaw puzzle is assembled;

wherein the top of the telescoping arm couples to the bottom center of the craft table such that the craft table is elevated above the sorting tray for use and is lowered to cover the open top of the sorting tray when not in use.

8. The jigsaw puzzle and craft support and storage device according to claim 7 wherein the craft table is adapted to tilt and swivel such that the craft table is oriented to face the user.

9. The jigsaw puzzle and craft support and storage device according to claim 8 wherein the top of the craft table comprises a non-slip surface that prevents the plurality of craft pieces from sliding when the craft table is tilted away from a horizontal orientation.

10. The jigsaw puzzle and craft support and storage device according to claim 9 wherein the non-slip surface is made of velvet, natural rubber, or synthetic rubber.

11. The jigsaw puzzle and craft support and storage device according to claim 9 wherein the craft table comprises a raised edge;

wherein the raised edge prevents the one or more craft pieces from being pushed off of the craft table.

12. The jigsaw puzzle and craft support and storage device according to claim 11 wherein the raised edge comprises the plurality of lights that are positioned above the plane of the craft table;

wherein the plurality of lights are battery-operated and are energized to illuminate the plurality of jigsaw puzzle pieces or craft pieces that reside on top of the craft table;

wherein a cover is included, and is further defined with cover clips that are able to clip onto a clip catch provided on an exterior, side surface of the sorting tray;

wherein the cover protects the craft or jigsaw puzzle being worked on the craft table when not in use.

13. The jigsaw puzzle and craft support and storage device according to claim 12 wherein the telescoping arm is an adjustable length armature comprising a plurality of arm segments;

wherein the telescoping arm is oriented vertically between the sorting tray and the craft table;

wherein the telescoping arm is lengthened by pulling up on the craft table and is shortened by pushing down on the craft table.

14. The jigsaw puzzle and craft support and storage device according to claim 13 wherein for two adjacent arm segments selected from the plurality of arm segments the outside diameter of a first arm segment matches the inside diameter of a second arm segment such that an external force causes the first arm segment to slide within the second arm segment wherein the first arm segment and the second arm segment hold the relative positions of the two adjacent arm segments in the absence of the external force.

15. The jigsaw puzzle and craft support and storage device according to claim 14 wherein a bottom arm segment of the telescoping arm is coupled to the center of the sorting tray;

wherein the maximum height of the bottom arm segment is less than the maximum height of the plurality of side walls such that the bottom arm segment does not extend above the plurality of side walls;

wherein when the telescoping arm is fully collapsed, all of the plurality of arm segments reside within the bottom arm segment such that no individual arm segments extend above the plurality of side walls.

16. The jigsaw puzzle and craft support and storage device according to claim 15 wherein a top arm segment comprises a tilt/swivel joint such that the craft table tilts and/or swivels with respect to the telescoping arm;

wherein the tilt/swivel joint permits the craft table to tilt forward and backwards, tilt left and right, rotate around a vertical axis, or any combination thereof;

wherein the tilt/swivel joint is a ball joint.

17. The jigsaw puzzle and craft support and storage device according to claim 16
  wherein an optional magnifier is able to clip onto the raised edge of the craft table.

\* \* \* \* \*